(12) United States Patent
Tsai et al.

(10) Patent No.: US 9,110,346 B2
(45) Date of Patent: Aug. 18, 2015

(54) ELECTROCHROMIC DEVICE

(71) Applicant: Leader Optronics Technology Co., Ltd., Tainan (TW)

(72) Inventors: Chih-Jen Tsai, Tainan (TW); Shyh-Haur Su, Tainan (TW)

(73) Assignee: Leader Optronics Technology Co., Ltd., Tainan (TW)

( * ) Notice: Subject to any disclaimer, the term of this patent is extended or adjusted under 35 U.S.C. 154(b) by 0 days.

(21) Appl. No.: 14/136,962

(22) Filed: Dec. 20, 2013

(65) Prior Publication Data

US 2014/0185124 A1 Jul. 3, 2014

(30) Foreign Application Priority Data

Dec. 28, 2012 (TW) .............................. 101151135 A (51) Int. Cl.
*G02F 1/155* (2006.01)

(52) U.S. Cl.
CPC ........ *G02F 1/155* (2013.01); *G02F 2001/1557* (2013.01)

(58) Field of Classification Search
CPC .................................................. G02F 1/155
USPC ......................................... 359/265, 271, 275
See application file for complete search history.

(56) References Cited

U.S. PATENT DOCUMENTS 7,054,050 B2 * 5/2006 Vincent et al. ................ 359/269
9,007,673 B2 * 4/2015 Tsai et al. ..................... 359/266

* cited by examiner

*Primary Examiner* — David N Spector
(74) *Attorney, Agent, or Firm* — Cesari and McKenna, LLP (57) ABSTRACT

An electrochromic device includes: a substrate having an inner surface; at least one first electrode layer formed on the inner surface; at least one second electrode layer formed on the inner surface and spaced apart from the first electrode layer; and an electrochromic unit formed on the first and second electrode layers and including an electrochromic layer and an electrolyte layer that is in contact with the electrochromic layer. When a potential is applied between the first and second electrode layers, the electrochromic layer can undergo chemical reduction or oxidation reactions and change color.

10 Claims, 8 Drawing Sheets

ELECTROCHROMIC DEVICE

CROSS-REFERENCE TO RELATED APPLICATION

This application claims priority of Taiwanese application no. 101151135, filed on Dec. 28, 2012.

BACKGROUND OF THE INVENTION

1. Field of the invention

The invention relates to an electrochromic device, and more particularly to an electrochromic device that includes an electrode layer and a plurality of metal lines formed on the electrode layer.

2. Description of the related art

Electrochromic devices include an electrochromic material that can change color when an electric field applied thereto is changed. Hence, the electrochromic devices can be used in the manufacture of products, such as sun glasses, window panels, and display screens.

Figure 1:
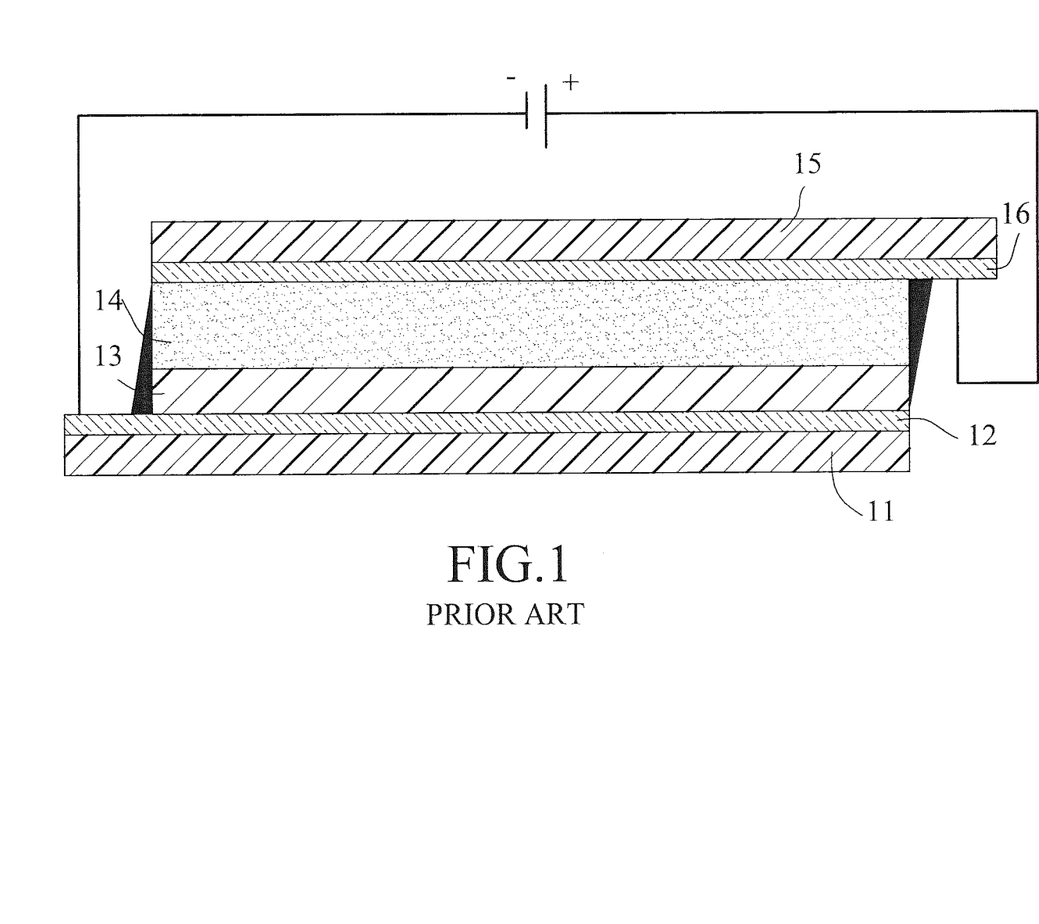
FIG. 1 is a sectional view of a conventional electrochromic device.

FIG. 1 illustrates a conventional electrochromic device that includes a first substrate 11, a transparent first electrode layer 12, an electrochromic layer 13, an electrolyte layer 14, a second substrate 15, and a transparent second electrode layer 16. The electrolyte layer 14 is indirect contact with the second electrode layer 16 and the electrochromic layer 13. When a potential is applied between the first and second electrode layers 12, 16, electrons released from the first electrode layer 12 enter the electrochromic layer 13, which causes chemical reduction and/or oxidation reactions of the electrochromic layer 13, and which, in turn, results in change in the color of the electrochromic layer 13. The rate of color change depends on the diffusion rate of the electrons in the electrochromic layer 13.

There is a need for reduction of the total thickness of the electrochromic device for miniaturization and thickness reduction purposes in electronic industries. In addition, when the dimension of the aforesaid conventional electrochromic device is relatively large, non-uniform color change of the electrochromic layer 13 tends to occur.

SUMMARY OF THE INVENTION

Therefore, the object of the present invention is to provide an electrochromic device that permits reduction of the total thickness thereof.

According to the present invention, there is provided an electrochromic device that comprises: a substrate having an inner surface; at least one first electrode layer formed on the inner surface; at least one second electrode layer formed on the inner surface and spaced apart from the first electrode layer; and an electrochromic unit formed on the first and second electrode layers and including an electrochromic layer and an electrolyte layer that is in contact with the electrochromic layer. When a potential is applied between the first and second electrode layers, the electrochromic layer can undergo chemical reduction or oxidation reactions and change color.

BRIEF DESCRIPTION OF THE DRAWINGS

In drawings which illustrate embodiments of the invention.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 2:
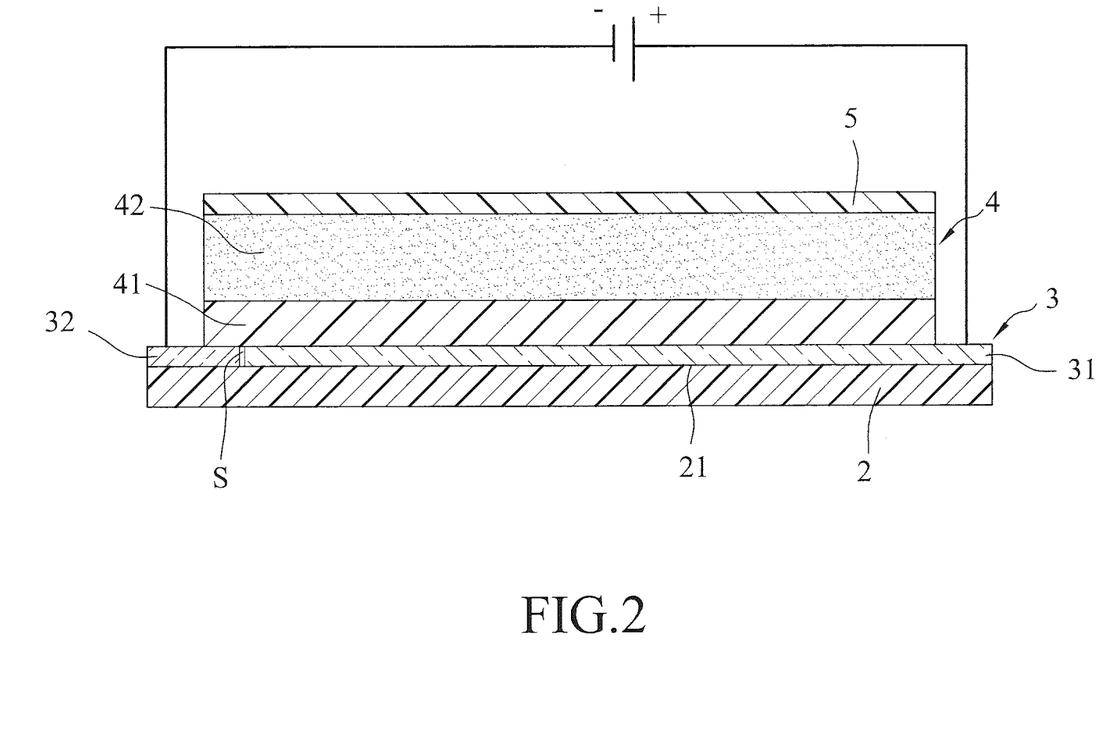
FIG. 2 is a sectional view of the first preferred embodiment of an electrochromic device according to the present invention.

FIG. 2 illustrates the first preferred embodiment of an electrochromic device according to the present invention. The electrochromic device includes a substrate 2 having an inner surface 21, an electrode unit 3, and an electrochromic unit 4. The electrode unit 3 includes first and second electrode layers 31, 32.

The first electrode layer 31 is formed on the inner surface 21 of the substrate 2. The second electrode layer 32 is formed on the inner surface 21 of the substrate 2, and is spaced apart from the first electrode layer 31 by a spacing (S). Preferably, the spacing (S) ranges from 0.1 μm to 10 mm.

The electrochromic unit 4 is formed on the first and second electrode layers 31, 32, and includes an electrochromic layer 41 that is in contact with the first and second electrode layers 31, 32, and an electrolyte layer 42 that is in contact with the electrochromic layer 41. When a potential is applied between the first and second electrode layers 31, 32, the electrochromic layer 41 can undergo chemical reduction or oxidation reactions and change color.

A protective layer 5 covers the electrochromic unit 4. The electrolyte layer 42 is disposed between and is in contact with the electrochromic layer 41 and the protective layer 5.

In this embodiment, the substrate 2 is flexible, and is made from a material that is selected from the group consisting of flexible polyethylene terephthalate, polycarbonate, polymer of acrylic acid, and combinations thereof. Alternatively, the substrate 2 may be rigid, and is made from a material that is selected from the group consisting of glass and rigid polyethylene terephthalate.

Each of the first and second electrode layers 31, 32 is made from a transparent conductive material that is selected from the group consisting of indium tin oxide (ITO), tin oxide ($SnO_2$), antimony tin oxide (ATO), zinc oxide, and combinations thereof.

The electrochromic layer 41 is made from a metal oxide, a transition metal cyanide, or a conductive organic polymer.

Examples of the metal oxide include tungsten trioxide ($WO_3$), Nickel(III) oxide ($Ni_2O_3$), Copper(II) oxide (CuO), Molybdenum trioxide ($MoO_3$), Vanadium(V) oxide ($V_2O_5$), Titanium dioxide ($TiO_2$), Caesium oxide ($Cs_2O$), Niobium (V) oxide ($Nb_2O_5$), Zinc oxide hydrate ($ZnO.xH_2O$), and combinations thereof. Examples of the transition metal cyanide include Ferric ferrocyanide, Indium hexacyanoferrate, Copper hexacyanoferrate, Nickel hexacyanoferrate, and combinations thereof. Examples of the conductive organic polymer include poly(3,4-ethylenedioxythiophene), polythiophene, polyaniline, pyrimidine dimer, Vioiogen, and combinations thereof.

The electrolyte layer 42 can be in liquid, solid, or gel form. In this embodiment, the electrolyte layer is a gel that includes an organic solvent, a polymeric material, propylene carbonate, and a salt. The organic solvet is selected from the group consisting of tetrahydrofuran (THF), alcohol, and the combination thereof. The polymeric material is selected from the group consisting of polymethylmethacrylate (PMMA), polystyrene and the combination thereof. The salt can be disassociated in the organic solvent into ions, one of which is selected from the group consisting of hydrogen ion, sodium ion, potassium ion, lithium ion and combinations thereof.

In this embodiment, the first and second electrode layers 31, 32 are rectangular in shape. The first electrode layer 31 has an area several times greater than that of the second electrode layer 32.

The first and second electrode layers 31, 32 are connected to an external power source. In operation, when an effective voltage is applied across the first and second electrode layers 31, 32 by the external power source, the electrochromic layer 41 may undergo chemical reduction and/or oxidation reactions and change color.

Figure 3:
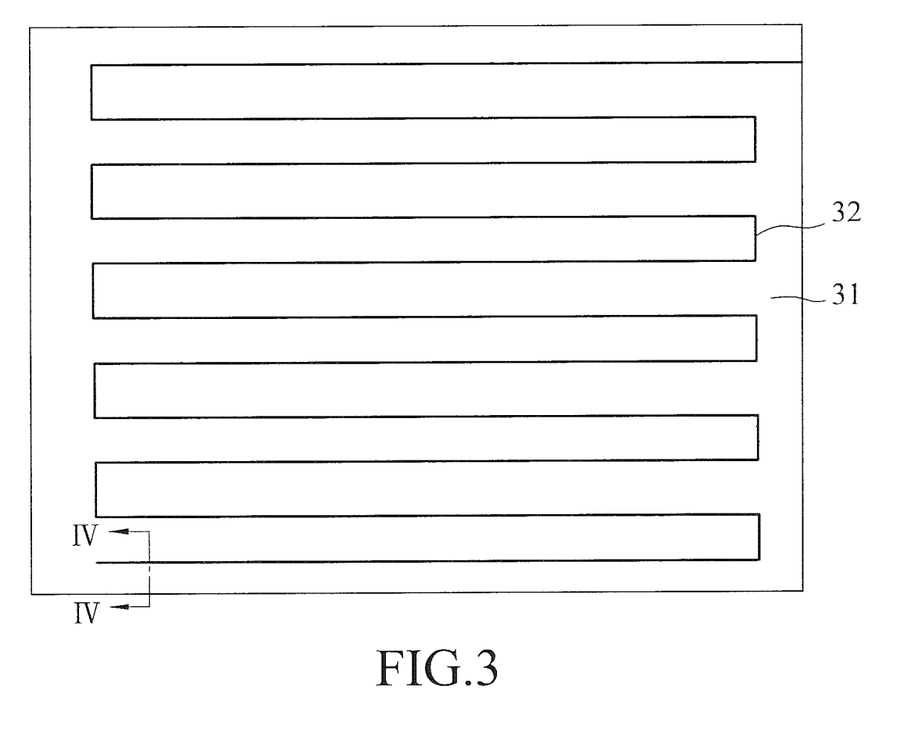
FIG. 3 is a schematic view illustrating an arrangement of first and second electrode layers of the second preferred embodiment of the electrochromic device according to the present invention.
Figure 4:
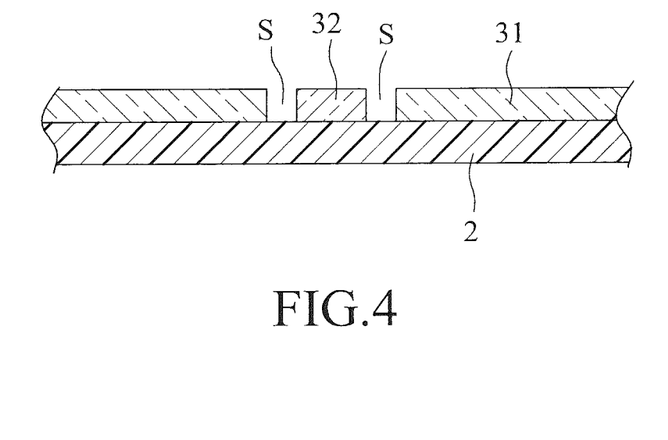
FIG. 4 is fragmentary sectional view taken along line IV-IV in FIG. 3.

FIGS. 3 and 4 illustrate the second preferred embodiment of the electrochromic device according to the present invention. The second preferred embodiment differs from the previous embodiment in that the second electrode layer 32 is in the form of a meandering line that is spaced apart from and that is surrounded by the first electrode layer 31. Note that the spacing (S) between the first and second electrode layers 31, 32 is not shown in FIG. 3 for the sake of clarity.

Figure 5:
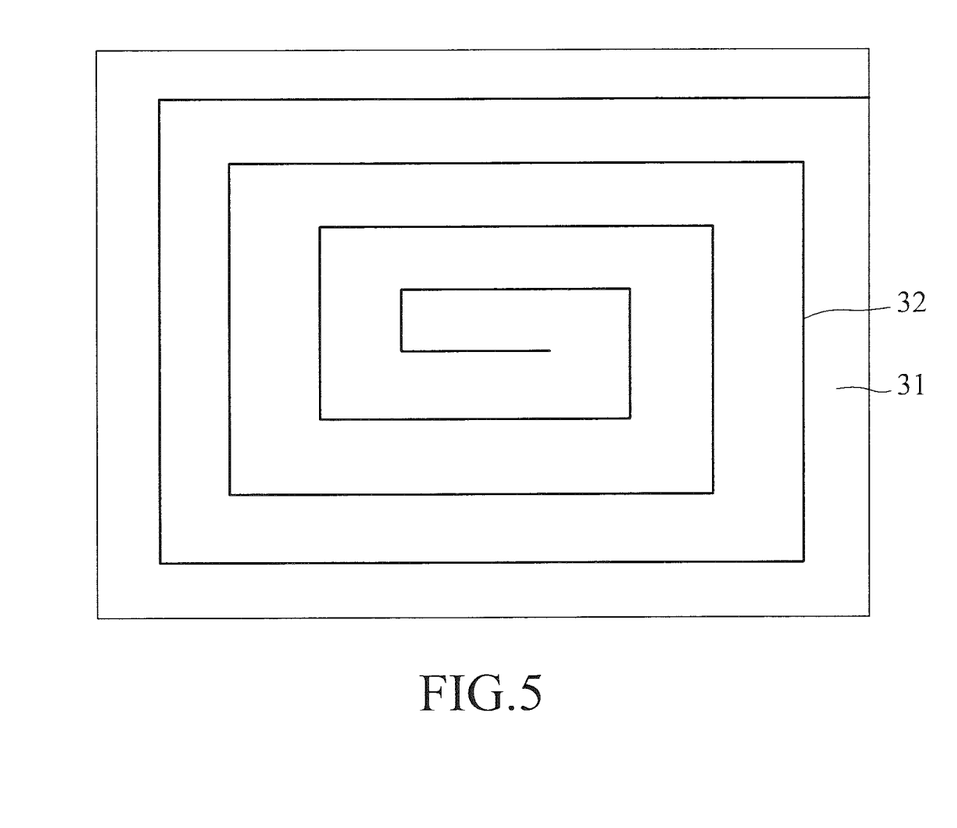
FIG. 5 is a schematic view illustrating an arrangement of first and second electrode layers of the third preferred embodiment of the electrochromic device according to the present invention.

FIG. 5 illustrates the third preferred embodiment of the electrochromic device according to the present invention. The third preferred embodiment differs from the second embodiment in that the second electrode layer 32 is in the form of a line that extends progressively away from an inner point as it revolves around the inner point. Note that the spacing (S) between the first and second electrode layers 31, 32 is not shown in FIG. 5 for the sake of clarity.

Figure 6:
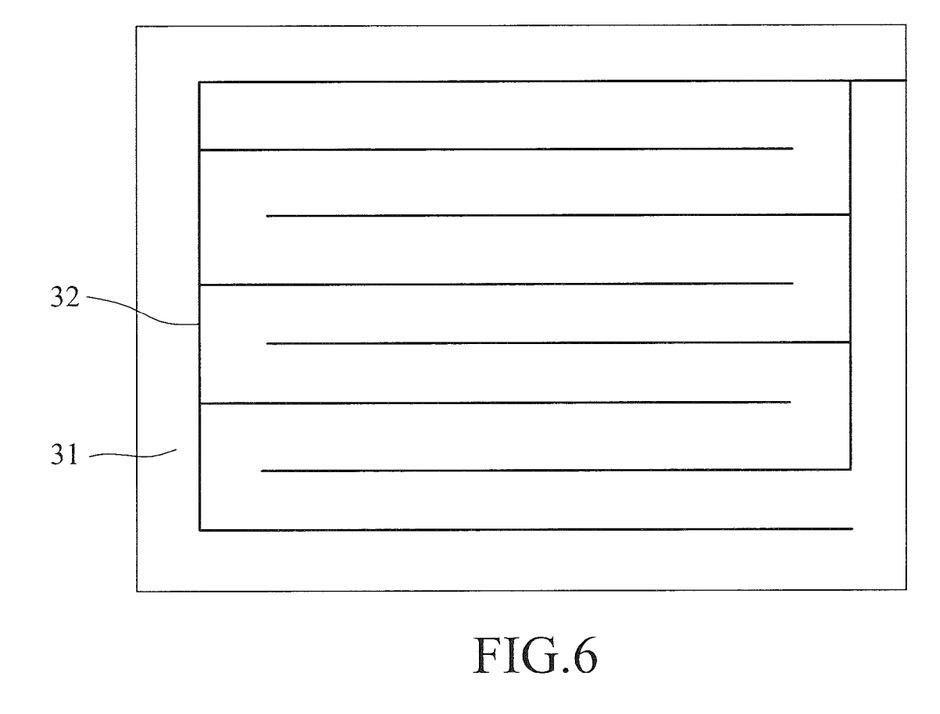
FIG. 6 is a schematic view illustrating an arrangement of first and second electrode layers of the fourth preferred embodiment of the electrochromic device according to the present invention.

FIG. 6 illustrates the fourth preferred embodiment of the electrochromic device according to the present invention. The fourth preferred embodiment differs from the previous embodiments in that the second electrode layer 32 is in the form of a plurality of lines having a comb-like interdigitated arrangement. Note that the spacing (S) between the first and second electrode layers 31, 32 is not shown in FIG. 6 for the sake of clarity.

Figure 7:
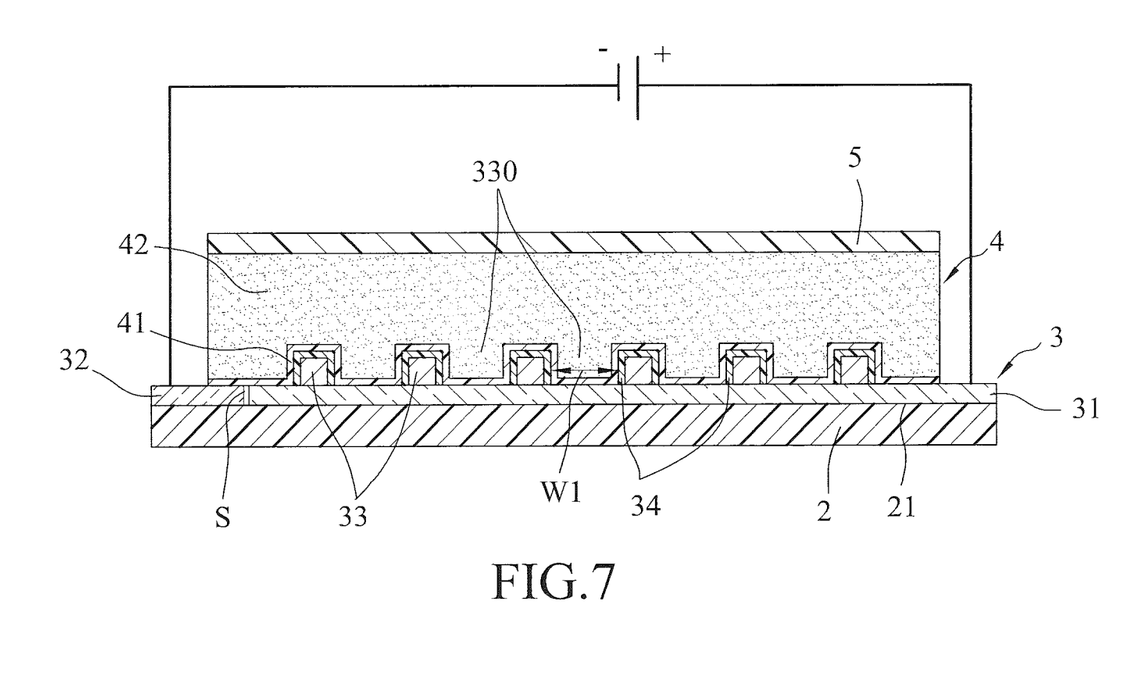
FIG. 7 is a sectional view of the fifth preferred embodiment of the electrochromic device according to the present invention.

FIG. 7 illustrates the fifth preferred embodiment of the electrochromic device according to the present invention. The fifth preferred embodiment differs from the first embodiment in that the electrode unit 3 further includes a plurality of first metal lines 33 and a plurality of first insulator strips 34. In this embodiment, the first metal lines 33 are formed on the first electrode layer 31. The first insulator strips 34 cover the first metal lines 33, respectively. The electrochromic layer 41 covers the first insulator strips 34. Every two adjacent ones of the first metal lines 33 are spaced apart from each other by a first gap 330 that has a width ($w_1$) ranging from 20 mm to 600 mm. With the inclusion of the first metal lines 33 in the electrochromic device of the present invention, the electric current applied across the first and second electrode layers 31, 32 by the external power source can spread uniformly throughout the electrochromic layer 41.

Each of the first metal lines 33 is made from a metallic material that is selected from the group consisting of Au, Ag, Cu, Al, and combinations thereof. Other suitable conductive metallic materials may be used in other embodiments.

The first insulator strips 34 are made from an electrical insulative material that is selected from the group consisting of photo curable resins, thermal curable resins, non-conductive curable resins, and epoxy resin, and that is capable of preventing penetration of the substances of the electrolyte layer 42 therethrough so as to avoid corrosion or formation of rust on the first metal lines 33.

Figure 8:
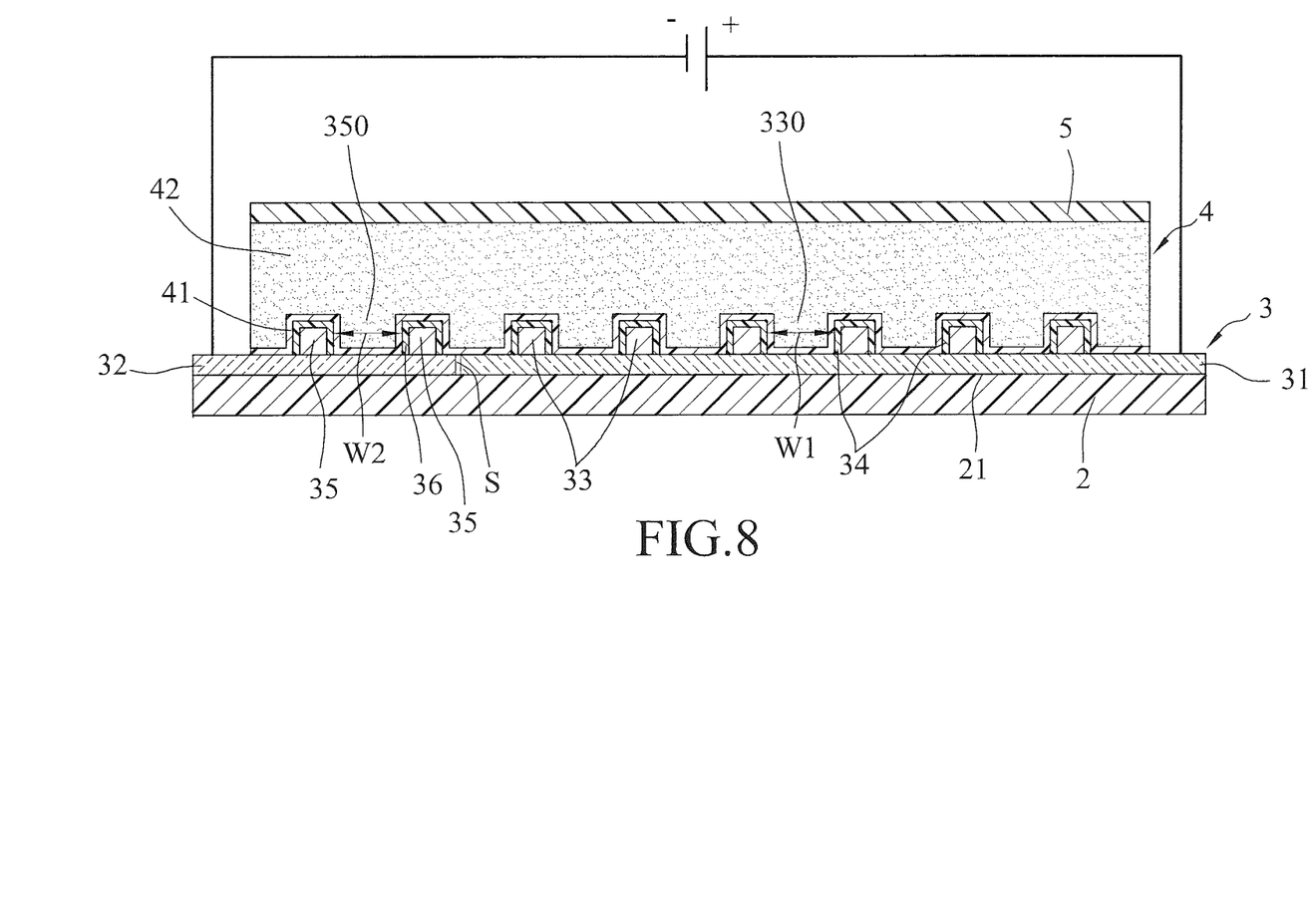
FIG. 8 is a sectional view of the sixth preferred embodiment of the electrochromic device according to the present invention.

FIG. 8 illustrates the sixth preferred embodiment of the electrochromic device according to the present invention. The sixth preferred embodiment differs from the fifth embodiment in that the electrode unit 3 further includes a plurality of second metal lines 35 that are formed on the second electrode layer 32, and a plurality of second insulator strips 36 that cover the second metal lines 35, respectively. The electrochromic layer 41 covers the second insulator strips 36. The second metal lines 35 can further enhance the spreading of the electric current to the electrochromic layer 41.

Every two adjacent ones of the second metal lines 35 are spaced apart from each other by a second gap 350 that has a width ($w_2$) ranging from 20 mm to 600 mm.

The first and second metal lines 33, 35 extend in the same direction. Alternatively, the first and second metal lines 33, 35 may extend in different directions. The second metal lines 35 are made from the metallic material. The second insulator strips 44 are made from the electrical insulator material.

By forming the first and second electrode layers 31, 32 on the inner surface 21 of the substrate 2 of the electrochromic device of this invention, the second substrate 15 required for the second electrode layer 16 of the aforesaid conventional electrochromic device can be dispensed with, thereby permitting reduction of the total thickness of the electrochromic device. In addition, with the inclusion of the first and second metal lines 33, 35 in the electrochromic device of this invention, uniform spreading of the electric current from the external power source to the electrochromic layer 41 may be achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electrochromic device comprising:
   a substrate having an inner surface;
   at least one first electrode layer formed on said inner surface;
   at least one second electrode layer formed on said inner surface and spaced apart from said first electrode layer; and
   an electrochromic unit formed on said first and second electrode layers and including an electrochromic layer and an electrolyte layer that is in contact with said electrochromic layer; wherein when a potential is applied between said first and second electrode layers, said electrochromic layer can undergo chemical reduction or oxidation reactions and change color, and wherein said electrochromic device further includes a plurality of first metal lines that are formed on said first electrode layer, and a plurality of first insulator strips that cover said first metal lines, respectively, in which said electrochromic layer covering said first insulator strips.

2. The electrochromic device of claim 1, further comprising a protective layer covering said electrochromic unit, said electrolyte layer being disposed between and being in contact with said electrochromic layer and said protective layer.

3. The electrochromic device of claim 1, wherein said first and second electrode layers are spaced apart from each other by a spacing that ranges from 0.1 μm to 10 mm.

4. The electrochromic device of claim 1, wherein said first and second electrode layers are made from a transparent conductive material.

5. The electrochromic device of claim 1, wherein said substrate is flexible.

6. The electrochromic device of claim 1, wherein said substrate is rigid.

7. The electrochromic device of claim 1, further comprising a plurality of second metal lines that are formed on said second electrode layer and a plurality of second insulator strips that cover said second metal lines, said electrochromic layer covering said second insulator strips.

8. The electrochromic device of claim 7, wherein said first and second metal lines extend in the same direction, two adjacent ones of said first metal lines being spaced apart from each other by a first gap that has a width ranging from 20 mm to 600 mm, and two adjacent ones of said second metal lines being spaced apart from each other by a second gap that has a width ranging from 20 mm to 600 mm.

9. The electrochromic device of claim 7, wherein said first and second metal lines are made from a metallic material that is selected from the group consisting of Au, Ag, Cu, Al, and combinations thereof.

10. The electrochromic device of claim 7, wherein said first and second insulator strips are made from an electrical insulative material that is selected from the group consisting of photo curable resins, thermal curable resins, non-conductive curable resins, and epoxy resin.

\* \* \* \* \*